(12) United States Patent
Chan et al.

(10) Patent No.: US 10,489,276 B2
(45) Date of Patent: *Nov. 26, 2019

(54) PROBATIONARY SOFTWARE TESTS

(71) Applicant: International Business Machines Corporation, Armonk, NY (US)

(72) Inventors: Philip S. P. Chan, Marrickville (AU); Laurence A. Hey, Manly (AU); William J. Izard, Sydney (AU); Matthew Ponsford, Manly (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,688

(22) Filed: Apr. 27, 2017

(65) Prior Publication Data

US 2017/0228308 A1 Aug. 10, 2017

Related U.S. Application Data

(63) Continuation of application No. 15/363,469, filed on Nov. 29, 2016, now Pat. No. 10,229,034, which is a continuation of application No. 14/086,198, filed on Nov. 21, 2013, now Pat. No. 9,588,875, which is a continuation of application No. 13/803,947, filed on Mar. 14, 2013, now Pat. No. 9,703,679.

(51) Int. Cl.
*G06F 11/36* (2006.01)
*G06F 9/44* (2018.01)
*G06F 11/00* (2006.01)

(52) U.S. Cl.
CPC ...... *G06F 11/3664* (2013.01); *G06F 11/3676* (2013.01); *G06F 11/3692* (2013.01)

(58) Field of Classification Search
CPC ..... G06F 8/71; G06F 8/61; G06F 8/65; G06F 11/3688; G06F 11/3664; G06F 11/3684; G06F 11/3692; G06F 11/3676; G06F 21/10; G06F 8/20; G06F 11/008; G06Q 10/06; H04L 63/20
See application file for complete search history.

(56) References Cited

U.S. PATENT DOCUMENTS

| 5,157,779 A | 10/1992 | Washburn et al. |
| 5,878,054 A | 3/1999 | Sherwood et al. |
| 6,002,869 A | 12/1999 | Hinckley |
| 6,023,580 A | 2/2000 | Sifter |
| 6,148,427 A | 11/2000 | Sherwood et al. |
| 6,715,108 B1 | 3/2004 | Badger et al. |

(Continued)

OTHER PUBLICATIONS

Kundu et al., A novel approach to system testing and reliability assessment using use case model. 2 pages (Year: 2008).*

(Continued)

*Primary Examiner* — Thuy Dao
(74) *Attorney, Agent, or Firm* — Brian J. Colandreo, Esq.; Jeffrey T. Placker, Esq.; Holland & Knight LLP

(57) ABSTRACT

A method, computer program product, and system is described. A continuous integration environment is identified. A first software test associated with the continuous integration environment is identified. A probationary status for the first software test is determined, the probationary status indicating, at least in part, a potential lack of reliability for the first software test.

14 Claims, 3 Drawing Sheets

(56) References Cited

U.S. PATENT DOCUMENTS

| | | | |
|---|---|---|---|
| 6,993,470 B2 | 1/2006 | Baumgartner et al. | |
| 7,107,491 B2 | 9/2006 | Graichen et al. | |
| 7,178,063 B1 | 2/2007 | Smith | |
| 7,356,432 B1 | 4/2008 | Lang | |
| 7,401,322 B1* | 7/2008 | Shagam | G06F 11/3676 714/35 |
| 7,506,312 B1 | 3/2009 | Girolami-Rose et al. | |
| 7,739,661 B2 | 6/2010 | Garzia et al. | |
| 7,747,987 B1* | 6/2010 | Akarte | G06F 11/3688 702/179 |
| 7,757,121 B1 | 7/2010 | Perron et al. | |
| 7,840,944 B2 | 11/2010 | Brunswig et al. | |
| 8,091,072 B2 | 1/2012 | Shah et al. | |
| 8,117,598 B2 | 2/2012 | Johnson et al. | |
| 8,266,592 B2 | 9/2012 | Beto et al. | |
| 8,327,333 B2 | 12/2012 | Nakagawa et al. | |
| 8,352,906 B2 | 1/2013 | Kashai et al. | |
| 8,413,131 B2 | 4/2013 | Bowers | |
| 8,423,964 B2 | 4/2013 | Holden et al. | |
| 8,423,967 B2* | 4/2013 | Holden | G06F 11/3676 717/125 |
| 8,522,083 B1 | 8/2013 | Cohen et al. | |
| 8,533,676 B2 | 9/2013 | Watters et al. | |
| 8,561,021 B2 | 10/2013 | Muharsky et al. | |
| 8,578,341 B2 | 11/2013 | Bassin et al. | |
| 8,626,559 B2 | 1/2014 | Keil et al. | |
| 8,930,772 B2 | 1/2015 | Sgro et al. | |
| 9,052,981 B2 | 6/2015 | Bassin et al. | |
| 9,092,576 B2 | 7/2015 | Samantaray | |
| 9,195,833 B2 | 11/2015 | Chestna | |
| 9,208,062 B1* | 12/2015 | Arguelles | G06F 11/3676 |
| 9,367,432 B2 | 6/2016 | Jivane et al. | |
| 9,424,169 B1 | 8/2016 | Galburt | |
| 9,519,477 B2* | 12/2016 | Champlin-Scharff | G06F 9/454 |
| 10,289,537 B2* | 5/2019 | Singi | G06F 11/3676 |
| 2005/0261859 A1 | 11/2005 | Petsinger | |
| 2006/0123389 A1* | 6/2006 | Kolawa | G06F 11/3616 717/101 |
| 2007/0038890 A1 | 2/2007 | El Far et al. | |
| 2007/0174069 A1 | 7/2007 | Moore, Jr. et al. | |
| 2007/0226546 A1 | 9/2007 | Asthana et al. | |
| 2008/0155343 A1* | 6/2008 | Branca | G06F 11/3688 714/38.14 |
| 2008/0215921 A1 | 9/2008 | Branca et al. | |
| 2008/0276129 A1* | 11/2008 | Cocker | G06F 11/3471 714/45 |
| 2008/0313501 A1 | 12/2008 | Lin et al. | |
| 2009/0006066 A1 | 1/2009 | Behm et al. | |
| 2009/0077427 A1 | 3/2009 | Ma et al. | |
| 2009/0158256 A1* | 6/2009 | Ponsford | G06F 8/20 717/125 |
| 2009/0265681 A1 | 10/2009 | Beto et al. | |
| 2009/0307763 A1* | 12/2009 | Rawlins | G06F 9/44505 726/5 |
| 2010/0095266 A1 | 4/2010 | Novak | |
| 2010/0131497 A1 | 5/2010 | Peterson | |
| 2010/0180260 A1* | 7/2010 | Chikkadevaiah | G06F 11/3664 717/125 |
| 2010/0318969 A1 | 12/2010 | Petrovicky et al. | |
| 2011/0004867 A1 | 1/2011 | Holden et al. | |
| 2011/0197176 A1* | 8/2011 | Muharsky | G06F 11/3672 717/113 |
| 2012/0005537 A1* | 1/2012 | Chen | G06F 11/3692 714/38.1 |
| 2012/0066548 A1 | 3/2012 | Barker et al. | |
| 2012/0102462 A1 | 4/2012 | Kushneryk et al. | |
| 2013/0007772 A1 | 1/2013 | Arcudi | |
| 2013/0074032 A1 | 3/2013 | Barragan | |
| 2013/0326299 A1 | 5/2013 | Oshima | |
| 2013/0254746 A1 | 9/2013 | Balakrishnan et al. | |
| 2014/0096111 A1 | 4/2014 | Mahler et al. | |
| 2014/0109037 A1 | 4/2014 | Ouali | |
| 2014/0157036 A1 | 6/2014 | Walton et al. | |
| 2014/0157061 A1 | 6/2014 | Bird et al. | |
| 2014/0157062 A1 | 6/2014 | Bird et al. | |
| 2014/0157063 A1 | 6/2014 | Bird et al. | |
| 2014/0157235 A1 | 6/2014 | Bird et al. | |
| 2014/0237450 A1* | 8/2014 | Levy | G06F 11/3684 717/124 |
| 2016/0147645 A1 | 5/2016 | Kandpal | |
| 2016/0150363 A1 | 5/2016 | Hughes | |

OTHER PUBLICATIONS

Abosaq et al., Improvement of software reliability modeling predictions by the detection and removal of test outliers, 5 pages (Year: 2009).*

Guimaraes, "Improving Early Detection of Software Merge Conflicts," http://ieeexplore.ieee.org/xpl/articleDetails.jsp?tp=&arnumber=6227180&contentType=Conference+Publications&searchWithin%3DTesting%26sortType%3Ddesc_p_Publication_Year%26queryText%3DContinuous+Integration+Environments, downloaded Mar. 12, 2013, pp. 1 Abstract Only.

Kim et al., "Test Automation Framework for Implementing Continuous Integration,", http://ieeexplore.ieee.org/xpl/articleDetails.jsp?tp=&arnumber=5070717&contentType=Conference+Publications&searchWithin%3DTesting%26searchWithin%3Dcode%26sortType%3Ddesc_p_Publication_Year%26queryText%3DContinuous+Integration+Environments, downloaded Mar. 12, 2013, pp. 1 Abstract Only.

Mockun, "Automated Tests in Continuous Integration Environment," http://www.cognifide.com/blogs/quality-assurance/automated-tests-continous-integration-environment-1/, downloaded on Mar. 12, 2013, pp. 1-5.

Pham et al., "Beyond Plain Video Recording of GUI Tests," IEEE 2012, AST 2012, Zurich, Switzerland, pp. 103-109.

Elyasov, "Log-Based Testing," IEEE 2012, ICSE 2012, Zurich, Switzerland Doctorial Symposium, pp. 1591-1594.

Gui et al., "Combining Model Checking and Testing with an Application to Reliability Prediction and Distribution," ISSTA '13, Jul. 15-20, 2013, http://dx.doi.org/10.1145/2483760.2483779, pp. 101-111.

Fujii et al., "Towards Quantitative Software Reliability Assessment in Incremental Development Processes," ICSE 11, May 21-28, 2011, pp. 41-50.

Ikemoto et al., "Estimating Software Reliability via Pseudo Maximum Likelihood Method," 2012, 6 pages.

* cited by examiner

PROBATIONARY SOFTWARE TESTS

RELATED APPLICATIONS

The subject application is a continuation application of U.S. patent application Ser. No. 15/363,469, filed on Nov. 29, 2016, which is a continuation application of U.S. Pat. No. 9,588,875, issued on Mar. 7, 2017, which is a continuation application of U.S. patent application Ser. No. 13/803,947, filed on Mar. 14, 2013, the entire contents of which are herein incorporated by reference.

TECHNICAL FIELD

This disclosure relates to testing of software.

BACKGROUND

In software development it may be useful to implement integrated, unit, and/or other tests for software code. These tests may be run with respect to the code under development, for example, within an Integrated Development Environment ("IDE") in order to ensure the code under development is properly written, functions correctly with respect to existing code, and so on. An IDE may be an application or process that facilitates software code development in various known ways. In certain embodiments, an IDE may operate with various source control (or version control) management processes and systems and may be in communication with source control repositories and/or other software code storage systems. IDE's may vary among individuals and organizations and may include various types of functionality. A unit test may be a test in which individual units of source code, and/or various modules are tested, often in conjunction with various relevant control data and procedures. An integrated test may be a test in which individual software modules are combined and tested as a group.

In certain instances, code tests may be run within a Continuous Integration ("CI") environment (e.g., as facilitated by a CI application or process), which may facilitate the integration of the development work of various developers and testing of code in various ways. In certain instances, a CI environment may be associated with regular (e.g., daily) merging of various developer workspaces into a shared mainline. A CI environment may additionally/alternatively be associated, for example, with the compiling of source code from various developers, the linking of various code files, the packaging of object/binary code in various ways, the execution of various software tests and/or test suites, and/or various other functionality relating to software code development. In certain instances a CI environment may facilitate automatically running one or more suites of tests (such as integrated and unit tests) with respect to each new build of code, in order to identify whether any new changes to the codebase may have caused a regression in code functionality and/or various other issues.

BRIEF SUMMARY OF THE DISCLOSURE

According to one aspect of the disclosure, a computer-implemented method includes identifying, by one or more computing devices, a continuous integration environment. The method includes identifying, by the one or more computing devices, a first software test associated with the continuous integration environment. The method includes determining, by the one or more computing devices, a probationary status for the first software test, the probationary status indicating, at least in part, a potential lack of reliability for the first software test.

One or more of the following features may be included. The method may include identifying a second software test associated with the continuous integration environment, the second software test having a promoted status. The method may include presenting, in a first format, first test result information associated with running the first software test. The method may include presenting, in a second format, second test result information associated with the second software test. The first format may be distinct from the second format based upon, at least in part, the probationary status of the first software test and the promoted status of the second software test. One or more of the first test result information and the second test result information associated with the second software test may include an aggregate pass/fail rate.

The method may include determining a promoted status for the first software test based upon, at least in part, identifying a sequence of successful runs for the first software test. The method may include determining a promoted status for the first software test based upon, at least in part, identifying a code consistency over a sequence of runs for the first software test. Identifying the probationary status may be based upon, at least in part, storing first test result information associated with running the first software test in a test result database and comparing the first test result information with other test result information in the test result database in order to, at least in part, identify an indicator of the potential lack of reliability for the first software test. Identifying the probationary status may be based upon, at least in part, identifying the first software test as a previously-promoted software test and determining an intermittent reliability of the first software test.

According to another aspect of the disclosure, a computer program product resides on a computer readable storage medium that has a plurality of instructions stored on it. When executed by a processor, the instructions cause a processor to perform operations including identifying a continuous integration environment. The operations include identifying a first software test associated with the continuous integration environment. The operations include determining a probationary status for the first software test, the probationary status indicating, at least in part, a potential lack of reliability for the first software test.

One or more of the following features may be included. The operations may include identifying a second software test associated with the continuous integration environment, the second software test having a promoted status. The operations may include presenting, in a first format, first test result information associated with running the first software test. The operations may include presenting, in a second format, second test result information associated with the second software test. The first format may be distinct from the second format based upon, at least in part, the probationary status of the first software test and the promoted status of the second software test. One or more of the first test result information and the second test result information may include an aggregate pass/fail rate.

The operations may include determining a promoted status for the first software test based upon, at least in part, identifying a sequence of successful runs for the first software test. The operations may include determining a promoted status for the first software test based upon, at least in part, identifying a code consistency over a sequence of runs for the first software test. Identifying the probationary status may be based upon, at least in part storing, in a test result database, test result information associated with running the first software test and comparing the test result information with other test result information in the test result database in order to, at least in part, identify an indicator of the potential lack of reliability for the first software test. Identifying the probationary status may be based upon, at least in part, identifying the first software test as a previously-promoted software test and determining an intermittent reliability of the first software test.

According to another aspect of the disclosure, a computing system includes one or more processor devices and one or more memory architectures coupled with the one or more processor devices. The one or more processor devices are configured to identify a continuous integration environment. The one or more processor devices are configured to identify a first software test associated with the continuous integration environment. The one or more processor devices are configured to determine a probationary status for the first software test, the probationary status indicating, at least in part, a potential lack of reliability for the first software test.

One or more of the following features may be included. The one or more processor devices may be configured to identify a second software test associated with the continuous integration environment, the second software test having a promoted status. The one or more processor devices may be configured to present, in a first format, first test result information associated with running the first software test. The one or more processor devices may be configured to present, in a second format, second test result information associated with the second software test. The first format may be distinct from the second format based upon, at least in part, the probationary status of the first software test and the promoted status of the second software test. One or more of the first test result information and the second test result information may include an aggregate pass/fail rate.

The one or more processor devices may be configured to determine a promoted status for the first software test based upon, at least in part, one or more of identifying a sequence of successful runs for the first software test and identifying a code consistency over a sequence of runs for the first software test. Identifying the probationary status may be based upon, at least in part storing, in a test result database, test result information associated with running the first software test and comparing the test result information with other test result information in the test result database in order to, at least in part, identify an indicator of the potential lack of reliability for the first software test. Identifying the probationary status may be based upon, at least in part, identifying the first software test as a previously-promoted software test and determining an intermittent reliability of the first software test.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
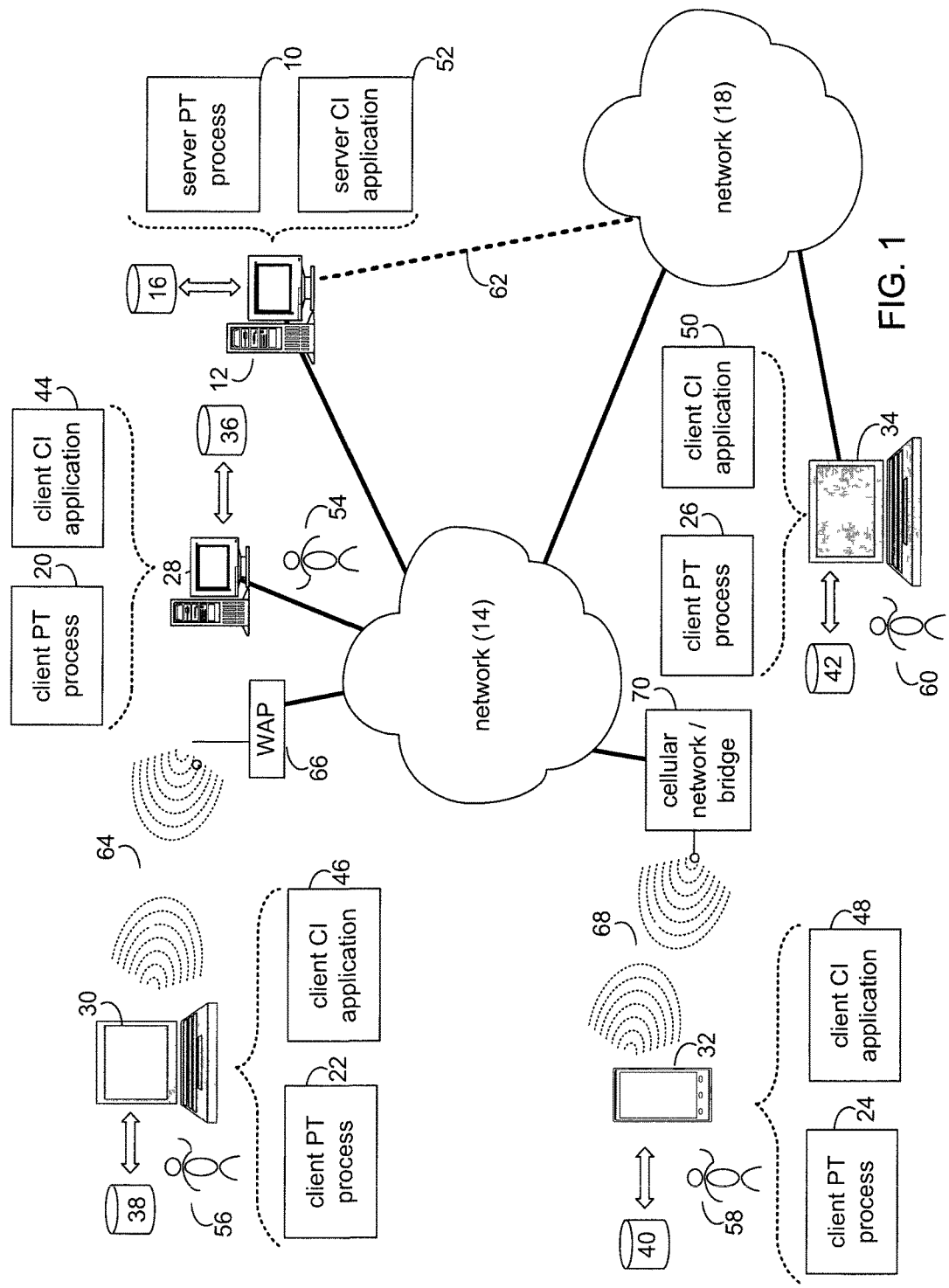
FIG. 1 is a diagrammatic view of a Probationary Test process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In certain instances, a particular software test (e.g., a unit test or integrated test) may run successfully in a particular IDE (e.g., an IDE associated with a particular developer), but may not run successfully within a CI environment (e.g., with respect to a particular build of a complete codebase) and/or another code development environment. This may result, for example, from differences between the IDE environment (and/or the code tested therein) and the CI (or other) environments and/or other factors, such as a tendency of the particular test to fail intermittently for various reasons. The uncertainty surrounding these (and/or other) issues may result, for example, in certain tests (e.g., tests that are new to a CI or other environment) being somewhat unreliable with respect to indicating the quality of code functionality and/or various aspects of the tested code. This may be problematic with respect to code development, for example, as it may be important to maintain a suite of CI (or other) tests with a 100% nominal pass rate, so that if a test failure is detected such failure may reliably be viewed as an indicator of a potential functional regression of code (i.e., of a defect introduced through a prior build) rather than, for example, an indicator of a faulty or otherwise unreliable test.

A Probationary Test ("PT") process (or application) may address these and/or various other issues. For example, a PT process may determine that a particular test has a "probationary" status or a "promoted" status, which may indicate, respectively, whether the particular test is to be viewed as a potentially unreliable test or not. In certain embodiments, a PT process may determine that a test previously determined to have a probationary status may merit an upgrade to a promoted status, as may be appropriate, for example, if the test to be upgraded is determined to have exhibited appropriately sufficient reliability. In certain embodiments, a PT process may display information relating to probationary tests differently from information relating to promoted tests, as may, for example, alert a user to the potential differences in reliability of the respective tests, and/or various other differences. In certain embodiments, a PT process may facilitate demotion of a test from promoted status to probationary status, as may be appropriate, for example, based upon identifying various indications of unreliability associated with the test that is to be demoted. Various other functionality may also be provided, as further discussed below.

Referring now to FIG. 1, a PT process may be coupled to a computer or computer network. For example, server PT process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server PT process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client PT processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client PT processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the PT process may be a server-side process (e.g., which may be implemented via server PT process 10), in which all of the functionality of the PT process may be executed on a server computer (e.g., server computer 12). In an embodiment, the PT process may be a client-side process (e.g., which may be implemented via one or more of client PT processes 20, 22, 24, 26), in which all of the functionality of the PT process may be executed on a client computing device (e.g., one or more of client electronic devices 28, 30, 32, 34). In an embodiment, the PT process may be a hybrid server-client process (e.g., which may be implemented by server PT process 10 and one or more of client PT processes 20, 22, 24, 26), in which at least a portion of the functionality of the PT process may be implemented via server computer 12 and at least a portion of the functionality of the PT process may be implemented via one or more client computing devices (e.g., one or more of client electronic devices 28, 30, 32, 34).

In certain embodiments, a PT process may be a stand-alone process. In certain embodiments, a PT process may operate as part of, or in conjunction with, one or more other processes and/or may include one or more other processes. For example, in certain embodiments, a PT process may be included in (or may operate in conjunction with) a Continuous Integration ("CI") application (or process), which may generally facilitate implementation of a continuous integration environment, and/or various other software development environments or tools (not shown). A CI environment may, for example, facilitate the merging of the code development work of various developers and the testing of code in various ways. For example, in certain instances a CI environment may facilitate automatically running a suite of tests (such as integrated and unit tests) with respect to new builds of the relevant code, in order to identify whether any new changes to the codebase may have caused a regression in code functionality and/or various other issues.

A CI application (or process) may operate (and/or reside) on a client device (e.g., client CI application 44, operating on client electronic device 28; client application CI 46, operating on client electronic device 30; client CI application 48, operating on client electronic device 32; or client CI application 50, operating on client electronic device 34). A client PT process (e.g., client PT process 20) or a server PT process (e.g., server PT process 10) may be in communication with a client CI application (e.g., client CI application 44) or may be part of a client CI application.

A CI application may additionally/alternatively operate (and/or reside) on a server device (e.g., server CI application 52, operating on server computer 12 or another server CI application (not shown), operating on another server computer (not shown)). A server PT process (e.g., server PT process 10) or a client PT process (e.g., client PT process 20) may be in communication with a server CI application (e.g., server CI application 52) or may be a part of a server CI application.

Users 54, 56, 58, 60 may access a PT process in various ways. For example, these users may access server PT process 10 directly through the device on which a client process (e.g., client PT processes 20, 22, 24, 26) is executed, namely client electronic devices 28, 30, 32, 34. Users 54, 56, 58, 60 may access server PT process 10 directly through network 14 and/or through secondary network 18. Further, server computer 12 (i.e., the computer that executes server PT process 10) may be connected to network 14 through secondary network 18, as illustrated with phantom link line 62. Users 54, 56, 58, 60 may also access a client or server CI application (or process) in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client PT process 20 will be described for illustrative purposes. It will be understood that client PT process 20 may, for example, interact and/or communicate with a server PT process such as server PT process 10 and/or may be executed within one or more applications that allow for communication with other server and/or client PT processes. This is not intended to be a limitation of this disclosure, as other configurations are possible (e.g., PT process 20 may include stand-alone client processes and/or stand-alone server processes). For example, some implementations may include one or more of client PT processes 22, 24, 26 or server PT process 10 in place of or in addition to client PT process 20.

Figure 2:
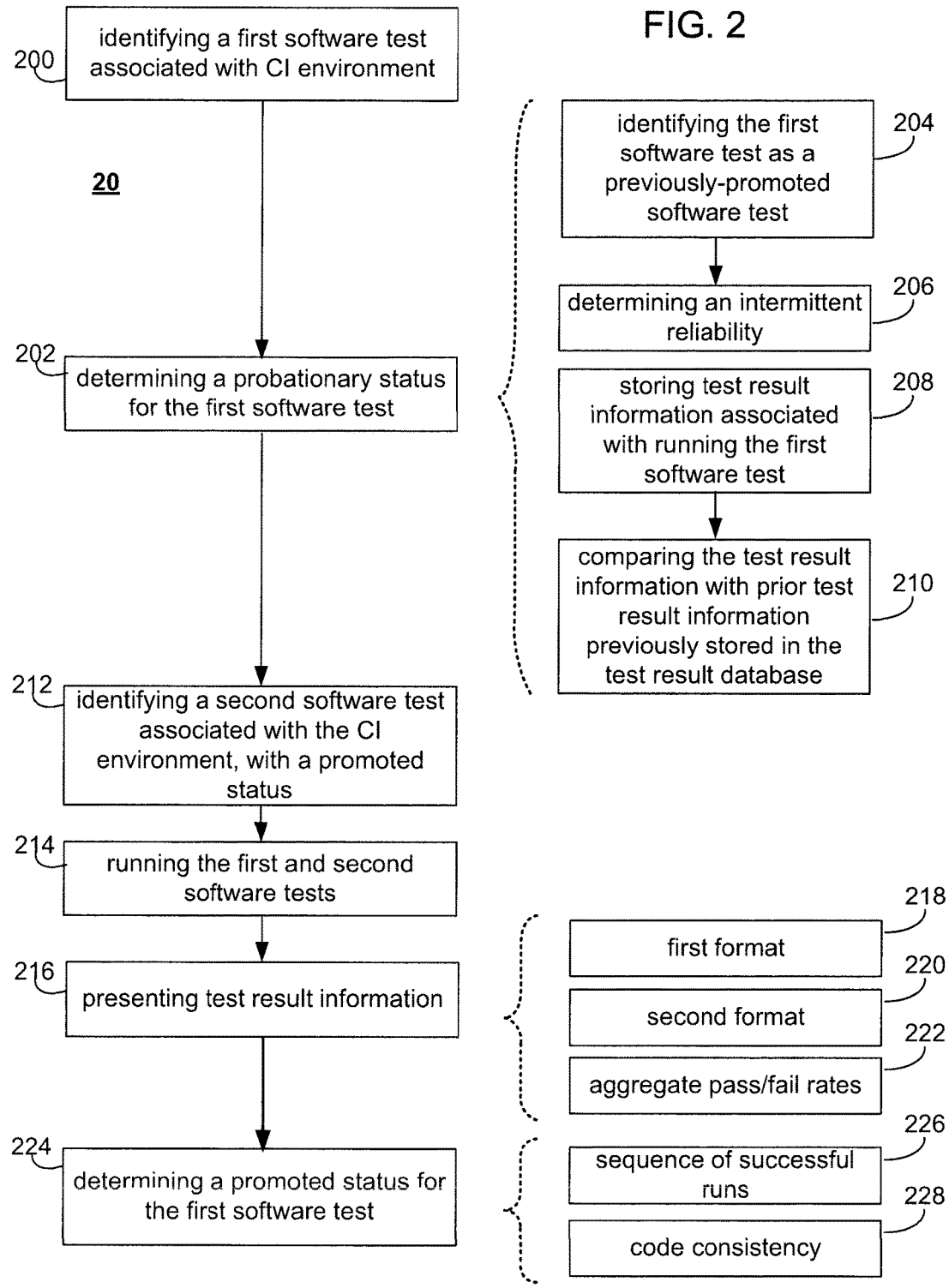
FIG. 2 is a flowchart of a process executed by the Probationary Test process of FIG. 1.

Referring now also to FIG. 2, there is shown a diagrammatic view of an example process that may be implemented by a PT process, e.g., client PT process 20. Client PT process 20 may identify 200 a first software test. For example, PT process 20 may identify a software test associated with an identified CI environment (e.g., may be a test forming part of a test suite that is applied to various builds of a codebase associated with the CI environment).

PT process 20 may determine 202 a probationary status for the identified 200 test. A probationary status may indicate, for example, that a particular test may not be fully reliable with respect to a particular CI environment, a particular code build, a particular test suite, and so on. For example, in various instances, tests may be recently added to a CI environment or a test suite associated with a CI environment and/or may have been recently updated (e.g., by revision of various code segments representing the relevant test logic). In certain embodiments, such recent and/or recently-updated (and/or various other) tests may appropriately be considered as somewhat unreliable (e.g., based upon their newness). For example, until a test has been appropriately vetted within a particular CI environment, it may be possible that the test may pass with respect to a particular code build (i.e., return a result indicating that tested code is acceptable with respect to the tested functionality/characteristic or otherwise) even though a pass may not have been appropriate (e.g., because the tested code does not actually exhibit acceptable functionality/characteristics, and so on). Similarly, such a test may sometimes fail (i.e., return a result indicating that tested code is not acceptable with respect to the tested functionality/characteristic or otherwise) even though a fail may not have been appropriate (e.g., because the tested code actually is acceptable with respect to the tested functionality/characteristic, and so on).

Such unreliability in tests (e.g., within a CI environment, or otherwise) may be problematic to software development. For example, it is generally preferred that a code build achieve a 100% nominal pass rate with respect to a test or suite of tests, so that if changes are made to the codebase a failed test may be relied upon to indicate a regression in the quality/functionality of the code rather than, for example, an issue with the failed test itself. As such, if a test cannot be relied upon to exhibit a 100% pass rate for suitable code, that test (and, for example, an associated test suite) may not provide fully useful information to code developers, development managers, and so on. As such, for example, it may be useful to determine 202 a probationary status for particular tests, in order to appropriately designate those tests (and related test results) as not fully reliable. A "probationary" status for a test may stand in contrast, for example, to a "promoted" status for a test, which may indicate a greater degree of reliability for a particular test. In this way, for example, code developers may be appropriately alerted/directed to more assiduously address test failures when such failures may be more likely to indicate actual problems with the codebase (e.g., rather than problems with the test itself).

It will be understood that, in certain embodiments, PT process 20 may determine 202 various levels of probationary status. For example, tests that may be brand new to a CI environment may be considered highly probationary, tests that have exhibited some reliability may be considered semi-probationary/semi-promoted, and tests that have been determined to be fully reliable may be considered to be fully promoted. Various other configurations and levels may also be possible.

In certain embodiments, a probationary status may be determined 202 for a test that may have previously been determined to have a promoted status. For example, it may be useful to remove/downgrade the promoted status of a test that, despite its promoted status, may be exhibiting (or may have exhibited) various signs of unreliability. For example, PT process 20 may identify 204 a test that has a promoted status (e.g., based upon an earlier determination by PT process 20). PT process 20 may then determine 202 a (new) probationary status for the identified 204 promoted test based upon, for example, determining 206 an intermittent reliability of the identified 204 test. For example, if a promoted (or other) test is exhibiting an intermittent pattern of pass/fail results with respect to a particular codebase(s) or build(s)—e.g., if the test sometimes passes and sometimes fails, without apparent connection to whether relevant tested code has been updated/changed—this may indicate that the test has become unreliable with respect to providing useful information about the functionality/quality of the tested code. As such, it may be appropriate to determine 202 a probationary status for such a test, even though the test may have been previously determined to have a promoted status.

PT process 20 may additionally/alternatively determine 202 a probationary status for an identified 204 promoted test based upon various other factors. For example, PT process 20 may determine that a previously-promoted test has been upgraded and/or otherwise edited since the previous code build/test run. Accordingly, because the upgraded/edited test may not necessarily exhibit the same reliability as the previous version of the test, it may be appropriate to determine 202 a probationary status for such a test. In certain embodiments, determining 202 a probationary status (e.g., for an identified 204 promoted test) may be based upon, at least in part, various user input. For example, PT process 20 may determine 206 an intermittent reliability for an identified 204 promoted test (and/or that the test has been recently updated) and may alert an administrator or other user associated with the relevant CI environment of such intermittent reliability (and/or recent update). This may result, for example, in user input indicating that the identified 204 promoted test should be determined 202 to have a probationary status, that the test should be flagged for further investigation, or that the test should remain a promoted test.

In certain embodiments, a probationary status may be determined 202 based upon analysis of various test results (and/or other) information. For example, PT process 20 may store 208 test result information associated with running an identified 202 test in a test result database (e.g., a database associated with storage device 36), and may compare 210 the stored 208 test result information with other test result information in the database (e.g., test result information from previous execution of various related tests). PT process 20 may compare 210 the stored 208 test result information with other test result information in order to, at least in part, identify an indicator of the potential lack of reliability of the first software test. For example, test result information may include identifying information for various tests (e.g., package, class and test names, whether the test has been previously determined to be probationary and/or promoted, and so on), the time a particular test was run, a pass/fail outcome for a test, the time a particular test was added to the relevant CI environment or test suite, the time a particular test was edited or updated, and/or various other information associated with various tests and/or test runs. Based upon comparing 210 test result information from various tests PT process 20 may, for example, determine that a particular test (e.g., an identified 200 test) is relatively new and/or has been updated/edited relatively recently, with respect to other tests associated with a relevant CI environment (e.g., with respect to the date the various tests were introduced to the CI environment, the number of times the various tests have been run, the last time the various tests were edited or otherwise transformed, and so on), which may indicate that the test may be potentially unreliable (or may be less reliable than a more established test). For example, in a simple case, a test that is brand new to a CI environment may have no corresponding information in a test result database, so comparison 210 of test result information (e.g., identifying information) for that test may indicate that the test is brand new to the CI environment (i.e., because such comparison 210 may indicate that there is no information in the test result database from earlier test runs of the new test). As also noted above, a relatively new test to a CI environment (and/or a newly edited test), for example, may not be as reliable with respect to relevant test results as tests that have been associated with the CI environment for a longer time (and/or have not been edited for some time). As such, it may be appropriate for PT process 20 to determine 202 a probationary status for such a test.

In certain embodiments, PT process 20 may determine 202 a probationary status for a previously-promoted test (e.g., a test that has been associated with a relevant CI environment for some time) based upon comparing 210 test result information. For example, based upon comparing 210 test result information, PT process 20 may determine 202 that a test that had been designated as "promoted" may have been significantly edited since the last execution of a relevant test suite, and/or may exhibit various other relevant characteristics. Accordingly, PT process 20 may determine 202 a probationary status for such a previously-promoted test.

As also noted above, determining 202 a probationary status for an identified 200 test may be associated with different treatment within a CI environment (and/or otherwise) of the identified 200 probationary test and associated test results, versus promoted (i.e., non-probationary) tests and associated test results. This may be useful, for example, in order to facilitate alerting appropriate users of the potential unreliability of probationary versus promoted tests and/or various other relevant information.

For example, PT process 20 may identify a test with a determined 202 probationary status and may also identify 212 a test with a promoted status. PT process 20 (alone and/or in conjunction with another application or process, such as CI application 44) may run 214 both the identified 200, 212 tests (e.g., in parallel, in series, and/or in various other ways) and may present 216 test result information from the tests to a user. In certain embodiments, PT process 20 may present 216 test result information associated with the identified 200 probationary test (e.g., aggregate pass/fail rates 222) in a first format 218 and may present 216 test result information associated with the identified 212 promoted test (e.g., aggregate pass/fail rates 222) in a second format 220. (It will be understood that aggregate pass/fail rates 222 may represent, individually and/or collectively, the pass/fail rate for a particular test over a plurality of test runs.) For example, test result information associated with the probationary test may be presented 216 in a separate portion of a relevant user interface from test result information associated with a promoted test, in a different font or with different prominence, and/or in various different formats 218, which may, for example, indicate to a user the probationary status of the relevant test(s). This may, accordingly, facilitate various users focusing on various test results in appropriate ways (e.g., addressing primary code correction efforts on errors identified by promoted tests, revising the code of probationary tests as appropriate, and so on).

Based upon a demonstrated reliability or consistency of a probationary test and/or various other factors, it may be appropriate, in certain embodiments, to upgrade the designation of a particular unit test from probationary to promoted. As such, for example, in certain embodiments PT process 20 may determine 224 a promoted status for the identified 200 software test. PT process 20 may determine 224 a promoted status for the identified 200 software test in a variety of ways and/or based on various types of information. For example, PT process 20 may determine 224 a promoted status for a test based upon a sequence 226 of successful runs of the test or determining code consistency 228. For example, if a probationary test has been successfully run (e.g., has passed or has otherwise successfully operated) for a particular number of test runs (e.g., three or more runs), over a particular number of code builds (e.g., three or more code builds) and so on, it may be appropriate to treat the test as having exhibited reasonable reliability and to determine 224 a promoted (or otherwise elevated) status for the test.

Similarly, for example, in certain embodiments PT process 20 may determine 224 a promoted status for an identified 200 test based upon identifying a code consistency over a sequence of test runs (or code builds and so on). For example, if a probationary test has not been edited (e.g., updated, rewritten in whole or part, and so on) in some time, this may, depending on the appropriate context, indicate that the probationary test may be considered appropriately reliable and that it may accordingly be upgraded to a promoted status. For example, the fact that a particular probationary test has not been changed by relevant developers for a certain number of test runs, code builds, and so on, may indicate that the relevant developers are satisfied with the performance of the test (e.g., because they have not determined that it is necessary to correct the test through modification of its code). As such, for example, it may be appropriate to determine 224 a promoted status for that test.

It will be understood that determining 224 a promoted status for a previously-probationary test (and/or determining 202 a probationary status for a previously-promoted code, and so on) may be executed with or without user input. For example, in certain embodiments PT process 20 may flag (e.g., through presentation 216 of test results associated with the test in a particular format 218) a probationary test that has exhibited a sequence 226 of successful runs, which may prompt an appropriate administrator to designate whether the test should be promoted or not. Similarly, in certain embodiments PT process 20 may flag a promoted test that has exhibited intermittent reliability, which may prompt an appropriate administrator to designate whether the test should be demoted or not. As part of such "flagging" (and/or otherwise), for example, PT process may present various relevant information to an administrator or other user in order to facilitate receiving appropriate user input regarding determining 202, 224 a probationary or promoted status (and/or for other reasons, such as to inform relevant users of the reasons for an automatic determination 202, 224). For example, PT process may present various information relating to a determined 206 intermittent reliability (e.g., may present 216 the frequency of test failure, the amount of time since the last time a test passed, the number/extent of code builds and/or other code updates that have occurred between a tests having passed and then failed (or vice versa), and so on) and/or various other information relevant to determining 202, 224 a relevant test status.

Figure 3:
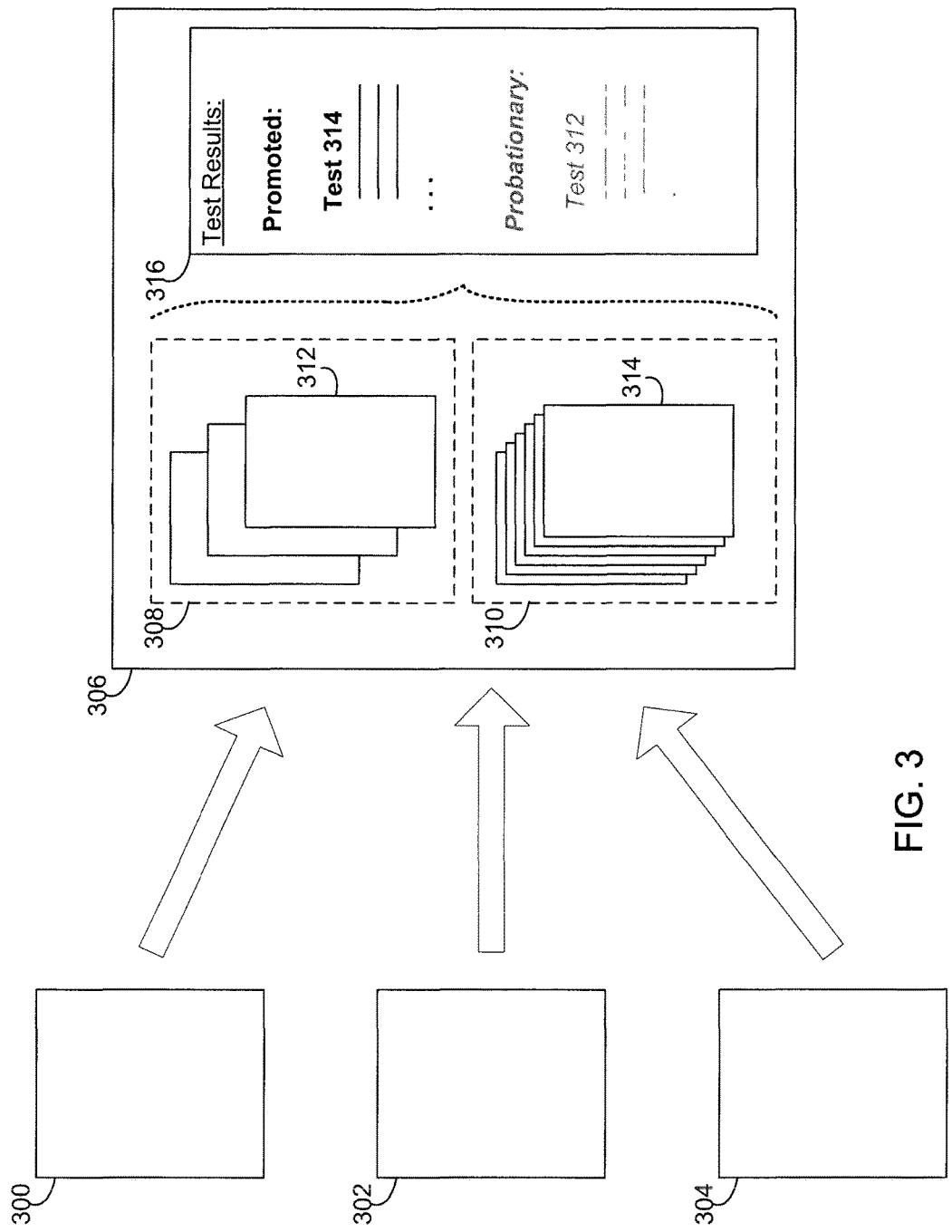
FIG. 3 is a diagrammatic view of an implementation of the Probationary Test process of FIG. 1.

Referring now also to FIG. 3, various code developers may compose and/or edit code in various IDEs, such as IDEs 300, 302 and 304. Code from these IDEs may be combined into various builds within CI environment 306 (e.g., with daily or other frequency). CI environment 306 may include various tests and/or test suites, which may be associated with probationary status 308 or promoted status 310 through the functionality of PT process 20. For example, unit test 312, which may have been newly added to a CI environment 306 test suite may be determined 202 to have a probationary status based upon, for example, its relative newness with respect to other tests associated with CI environment 306. Similarly, unit test 314, which may have been included in a relevant test suite for several builds and test runs, may be determined 224 to have a promoted status based upon, for example, its relative seniority with respect to other tests associated with CI environment 306. (It will be understood that determination 202, 224 of test status may not always be associated with relative age (e.g., with respect to a particular CI environment), reliability, and so on. For example, PT process 20 may determine 202 a probationary status based upon an absolute amount of time that a particular test (or revision of a test) has been associated with a particular CI environment, an absolute measure of reliability, and so on.)

Upon execution of a test suite (and/or based upon various other events, such as a user request for test information), PT process 20 (alone and/or in conjunction with another application or process) may present various information relating to various software tests associated with CI environment 306. For example, PT process 20 may present 216 test result information 316. In certain embodiments, presenting 216 test result information 316 may include presenting test result (or other) information that is associated with probationary tests differently (e.g., in a different format 218) than test result (or other) information that is associated with promoted tests. For example, with respect to test results 316, results from promoted tests may be presented 216 in a bold (and/or otherwise more prominent) format 220, whereas results from probationary tests may be presented in a grayed out (and/or otherwise less prominent) format 218. In certain embodiments, other configurations may also be possible. For example, PT process 20 may present 216 as a default only test results from promoted tests, presenting 216 test results from probationary tests, for example, only upon receiving an appropriate user input.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
    identifying, by one or more computing devices, a continuous integration environment;
    identifying, by the one or more computing devices, a first software test associated with the continuous integration environment;
    identifying a second software test associated with the continuous integration environment, the second software test having a promoted status;
    determining, by the one or more computing devices, a probationary status for the first software test based upon, at least in part, a recency with which the first software test was associated with the continuous integration environment with respect to the date the other software test was introduced to the continuous integration environment or the last time the other software test was edited in the continuous integration environment, the probationary status indicating, at least in part, a potential lack of reliability for the first software test, wherein identifying the probationary status is based upon, at least in part:
        storing, in a test result database, first test result information associated with running the first software test; and
        comparing the first test result information with other test result information in the test result database in order to, at least in part, identify an indicator of the potential lack of reliability for the first software test; and
    presenting, in a first format, first test result information associated with running the first software test and presenting, in a second format, second test result information associated with the second software test, wherein the first format is distinct from the second format based upon, at least in part, the probationary status of the first software test and the promoted status of the second software test.

2. The computer-implemented method of claim 1 wherein one or more of the first test result information and the second test result information include an aggregate pass/fail rate.

3. The computer-implemented method of claim 1 further comprising:
    determining a promoted status for the first software test based upon, at least in part, identifying a sequence of successful runs for the first software test.

4. The computer-implemented method of claim 1 wherein identifying the probationary status is based upon, at least in part:
    identifying the first software test as a previously-promoted software test; and
    determining an intermittent reliability of the first software test.

5. The computer-implemented method of claim 1 further comprising:
    determining a promoted status for the first software test based upon, at least in part, identifying a code consistency over a sequence of a plurality of runs for the first software test over a plurality of code builds, the code consistency including a lack of changes to the first software test over the sequence of runs for the first software test, the promoted status indicating a greater degree of reliability for the first software test.

6. A computer program product residing on a non-transitory computer-readable storage medium having a plurality of instructions stored thereon, which, when executed by a processor, cause the processor to perform operations comprising:
    identifying a continuous integration environment;
    identifying a first software test associated with the continuous integration environment;
    identifying a second software test associated with the continuous integration environment, the second software test having a promoted status;
    determining a probationary status for the first software test based upon, at least in part, a recency with which the first software test was associated with the continuous integration environment with respect to the date the other software test was introduced to the continuous integration environment or the last time the other software test was edited in the continuous integration environment, the probationary status indicating, at least in part, a potential lack of reliability for the first software test, wherein identifying the probationary status is based upon, at least in part:
        storing, in a test result database, first test result information associated with running the first software test; and
        comparing the test result information with other test result information in the test result database in order to, at least in part, identify an indicator of the potential lack of reliability for the first software test; and
    presenting, in a first format, first test result information associated with running the first software test and presenting, in a second format, second test result information associated with the second software test, wherein the first format is distinct from the second format based upon, at least in part, the probationary status of the first software test and the promoted status of the second software test.

7. The computer program product of claim 6 wherein one or more of the first test result information and the second test result information include an aggregate pass/fail rate.

8. The computer program product of claim 6 wherein the operations further comprise:
    determining a promoted status for the first software test based upon, at least in part, identifying a sequence of successful runs for the first software test.

9. The computer program product of claim 6 wherein identifying the probationary status is based upon, at least in part:
    identifying the first software test as a previously-promoted software test; and
    determining an intermittent reliability of the first software test.

10. The computer program product of claim 6 further comprising:
    determining a promoted status for the first software test based upon, at least in part, identifying a code consistency over a sequence of a plurality of runs for the first software test over a plurality of code builds, the code consistency including a lack of changes to the first software test over the sequence of runs for the first software test, the promoted status indicating a greater degree of reliability for the first software test.

11. A computer system comprising:
    one or more processor devices; and
    one or more memory architectures coupled with the one or more processor devices;
    wherein the one or more processor devices are configured to:
        identify a continuous integration environment;
        identify a first software test associated with the continuous integration environment;
        identify a second software test associated with the continuous integration environment, the second software test having a promoted status;
        determine a probationary status for the first software test based upon, at least in part, a recency with which the first software test was associated with the continuous integration environment with respect to the date the other software test was introduced to the continuous integration environment or the last time the other software test was edited in the continuous integration environment, the probationary status indicating, at least in part, a potential lack of reliability for the first software test, wherein identifying the probationary status is based upon, at least in part:
            storing, in a test result database, test result information associated with running the first software test; and
            comparing the test result information with other test result information in the test result database in order to, at least in part, identify an indicator of the potential lack of reliability for the first software test; and
        present, in a first format, first test result information associated with running the first software test and present, in a second format, second test result information associated with the second software test, wherein the first format is distinct from the second format based upon, at least in part, the probationary status of the first software test and the promoted status of the second software test.

12. The computer system of claim 11 wherein one or more of the first test result information and the second test result information include an aggregate pass/fail rate.

13. The computer system of claim 11 wherein the one or more processor devices are further configured to:
    determine a promoted status for the first software test based upon, at least in part, one or more of:

identifying a sequence of successful runs for the first software test.

14. The computer system of claim 11 wherein identifying the probationary status is based upon, at least in part:
identifying the first software test as a previously-promoted software test; and
determining an intermittent reliability of the first software test.

* * * * *